United States Patent [19]

Kiyonaga et al.

[11] 4,218,243
[45] Aug. 19, 1980

[54] FULLY MARTENSITIC STEEL FOR A METAL MOLD FOR MOLDING GLASS AND THE METAL MOLD

[75] Inventors: Kingo Kiyonaga, Yonago; Toshio Okuno; Kenji Tokuda, both of Yasugi, all of Japan

[73] Assignee: Hitachi Metals, Ltd., Tokyo, Japan

[21] Appl. No.: 877,807

[22] Filed: Feb. 15, 1978

Related U.S. Application Data

[63] Continuation-in-part of Ser. No. 490,655, Jul. 22, 1974, abandoned.

[30] Foreign Application Priority Data

Sep. 20, 1972 [JP] Japan .................................. 47-93589

[51] Int. Cl.² ............................................. C22C 39/14
[52] U.S. Cl. .................................. 75/124; 65/374 M; 75/126 H; 75/126 J; 75/126 Q
[58] Field of Search .................. 75/124, 126 H, 126 J, 75/126 Q; 65/374 M

[56] References Cited

U.S. PATENT DOCUMENTS

| | | | |
|---|---|---|---|
| 2,288,660 | 7/1942 | von Kantzow et al. | 75/124 |
| 2,409,797 | 10/1946 | Rehnquist | 75/124 |
| 2,848,323 | 8/1958 | Harris et al. | 75/124 |
| 2,990,275 | 6/1961 | Binder et al. | 75/126 H |
| 3,499,802 | 3/1970 | Lagenborg | 148/37 |

FOREIGN PATENT DOCUMENTS

49-6013 1/1974 Japan .................................... 65/374 M

OTHER PUBLICATIONS

"A Dictionary of Metallurgy", A. D. Merriman, 1958, pp. 180–181.

*Primary Examiner*—R. Dean
*Assistant Examiner*—Upendra Roy
*Attorney, Agent, or Firm*—Craig & Antonelli

[57] ABSTRACT

A steel which consists essentially of 0.25–0.65% of C, up to 2.50% of Si, up to 2.00% of Mn, 10.00–20.00% of Cr, 4.00–13.00% of Co, 1.00–3.00% of Al, up to 0.25% of N and the balance essentially Fe and ordinary impurities and satisfies the relation:

$$\text{Cr equivalent} = -40\text{C}(\%) + 6\text{Si}(\%) - 2\text{Mn}(\%) + \text{Cr}(\%) - 2\text{Co}(\%) - 30\text{N}(\%) + 12\text{Al}(\%) \leq 13\%$$

provides a metal mold which need not be Cr-plated and is suitable of use in molding high-quality glass wares.

4 Claims, 2 Drawing Figures

FULLY MARTENSITIC STEEL FOR A METAL MOLD FOR MOLDING GLASS AND THE METAL MOLD

CROSS REFERENCE TO THE RELATED APPLICATION

This is a continuation-in-part of the U.S. Ser. No. 490,655 filed on July 22, 1974 which is now abandoned.

BACKGROUND OF THE INVENTION

This invention relates to a steel for a metal mold for molding glass and a mold for molding glass, which, without being chromium-plated, is suitable for use in casting high-quality glass wares with requisite excellent surface appearance, exhibits a good resistance against development of surface irregularities or thermoplastic strain in the surface under the thermal stress condition during casting operation, and has an excellent anti-heat-check life.

In general, in a high-quality metal mold for molding glass, there has frequently been used 13-Cr martensite stainless steel (equivalent to AISI 420 having a hardness of $H_B$ 235) which is subsequently chromium-plated in order to keep the mold surface from oxidation and corrosion, to improve the mold release property, ensuring a fine surface of the molded glass, and to improve the mold life.

The factors affecting the mold life include development of surface irregularities due to oxidation at high temperatures, chemical corrosion caused by Glanber's salt, formation of an irregular surface pattern due to thermal stress during the molding operation owing to insufficient mechanical strengths at high temperatures, and formation of surface irregularities of the abrasion type resulting from insufficient resistances to heat check and wear.

Accordingly, it is required for the mold material to meet the following requirements:

(1) High oxidation resistance at high temperatures.
(2) High corrosion resistance to Glauber's salt.
(3) High mechanical strengths at room temperature and at high temperatures.
(4) High heat check resistance.

In connection with the above properties, the mold material should meet the following requirements:

(5) Heat conductivity not being excessively low.
(6) Thermal expansion coefficient not exhibiting an extraordinary tendency.
(7) Good mold release property and sufficient resistance to seizure.
(8) Fine crystal grain.
(9) Susceptibility to excellent mirror finish.

In these respects, because of its insufficient resistances to oxidation and corrosion, a conventional 13-Cr martensite stainless steel cannot withstand normal usage unless it is chromium-plated. Furthermore, even if it is chromium-plated, owing to the oxidation, erosion, peeling-off and wear of the chromium-plating itself, the mold cannot acquire satisfactory durability by the present day technique particularly in the case where the mold is used in molding glass wares which are primarily required to have an excellent surface appearance.

SUMMARY OF THE INVENTION

This invention relates to a steel of the martensite type for mold for glass molding, which has oxidation and corrosion resistances sufficient for use, without being chromium-plated, in molding high-quality glass articles and has excellent mechanical strengths and other physical properties at both ordinary and high temperatures which cojointly with said excellent resistances minimize the surface thermoplastic strain due to a thermal stress during molding operation, thus providing an excellent anti-heat-check life for the mold and it also relates to a mold produced from said steel.

The steel composition used in making the mold of this invention has been invented on the basis of the following considerations:

(1) In order that the mold may be used without chromium-plating, the steel composition is incorporated with a combination of Cr and Al or a combination of Cr, Al and Si to impart to the steel an oxidation resistance and a corrosion resistance to Glauber's salt both superior to those of metallic chromium.

(2) In order to impart to the mold mechanical strengths sufficiently high for preventing the development of thermoplastic strain as well as heat checks in the surface layer of the mold, an appropriate balance is maintained between the martensite producing elements including C, Co, Mn and N and the ferrite producing elements including Cr, Al and Si so that single phase of martensite may be formed on hardening and tempering treatments (avoiding the formation of ferrite structure or a structure intermingled with ferrite structure); and the standard hardness after heat treatment should be $H_B$ 229–293. In this connection, (a) formation of austenite structure is avoided in order to decrease the thermal expansion coefficient and to increase as far as possible the thermal conductivity (both physical properties being main factors affecting the magnitude of thermal stress) so that the thermal stress developed in the surface layer of the mold during molding operation may be minimized; (b) the balance among components suitable for the formation of the single martensite phase structure can be controlled by means of the following Cr-equivalent:

$$\text{Cr-equivalent} = -40C(\%) + 6Si(\%) - 2Mn(\%) + Cr(\%) - 2Co(\%) - 30N(\%) + 12Al(\%) \leqq 13.00\%$$

(3) In order to prevent seizure of the molding surface during glass molding and to impart a desirable release property to the mold, C is incorporated to form carbides and Co is incorporated so that a dense and non-peeling oxide film may be formed on the mold surface during the heating stage of the molding operation.

(4) Incorporation of Ni should be avoided, because the hardening of mold due to deposition of a Ni-Al intermetallic compound and the accompanying reduction in toughness may result in cracking of the mold under the use conditions involving a large thermal shock.

DESCRIPTION OF THE INVENTION AND PREFERRED EMBODIMENTS

Figure 1:
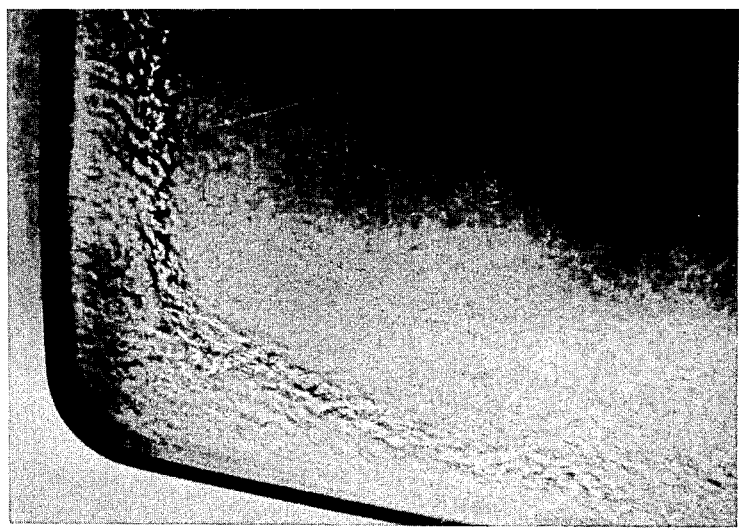
FIG. 1 shows a photograph of an example of a mold made of a low C-Cr-Al ferrite steel and FIG. 2 shows a photograph of a steel of martensite structure with intermingled ferrite.

A. Oxidation resistance and corrosion resistance.

Table 1 shows the heat treatment conditions and the oxidation resistance of the test specimen of the present steel composition.

utilized in the case where the maximum molding temperature is relatively low, depending upon the purpose and use of the mold.

Table 1

| | | C | Si | Mn | Cr | Al | Co | N | Heat treatment condition | Wt. increase due to oxidation (mg/cm²) 900° C. × 20 hr. | Cr-equivalent % |
|---|---|---|---|---|---|---|---|---|---|---|---|
| A | (Steel of the present invention) | 0.41 | 0.39 | 0.42 | 14.07 | 2.03 | 6.00 | 0.016 | Air-cooled at 1,100° C. Tempered at 740° C. | 0.06 | +11.0 |
| B | (Steel of the present vention) | 0.63 | 0.40 | 0.43 | 18.03 | 2.85 | 12.00 | 0.018 | Air-cooled at 1,140° C. Tempered at 740° C. | 0.04 | −6.4 |
| C | (Steel of the present invention) | 0.45 | 1.46 | 0.42 | 15.98 | 1.46 | 9.79 | 0.015 | Air-cooled at 1,120° C. Tempered at 740° C. | 0.06 | +3.4 |
| D | (Steel of the present invention) | 0.46 | 0.45 | 0.40 | 19.46 | 2.27 | 6.75 | 0.17 | Air-cooled at 1,140° C. Tempered at 740° C. | 0.04 | +11.6 |
| E | (Comparative steel) | 0.06 | 0.41 | 0.39 | 14.98 | 2.94 | — | — | Air-cooled at 750° C. | 0.05 | +49.4 |
| F | (Prior art steel) | 0.25 | 0.71 | 0.69 | 12.68 | — | — | — | Oil-cooled at 980° C. Tempered at 730° C. | 0.46 | — |
| Metallic Cr | | — | — | — | — | — | — | — | — | 0.19 | — |

It is seen from Table 1 that owing to the inclusion of a combination of Cr and Al or the inclusion of Cr, Al and Si, in oxidation resistance the present steel is far superior to the prior art sheet and comparable to the comparative steel (low C-Cr-Al ferrite steel for use as an electric heating element) and even superior to metallic chromium.

Table 2 shows the data about the effect of Al, Cr and Si on the oxidation resistance.

Table 2

| | C | Si | Mn | Cr | Al | Co | N | Weight increase due to oxidation (mg/cm²) 900° C. × 20 hr. |
|---|---|---|---|---|---|---|---|---|
| (a) | 0.43 | 0.35 | 0.25 | 14.08 | — | 5.01 | 0.017 | 5.14 |
| (b) | 0.44 | 0.31 | 0.31 | 14.15 | 0.53 | 5.11 | 0.016 | 0.85 |
| (c) | 0.43 | 0.30 | 0.27 | 14.10 | 1.11 | 5.23 | 0.015 | 0.26 |
| (d) | 0.45 | 0.29 | 0.29 | 14.02 | 1.60 | 5.17 | 0.015 | 0.15 |
| (e) | 0.42 | 0.33 | 0.28 | 14.06 | 2.28 | 5.19 | 0.023 | 0.06 |
| (f) | 0.44 | 0.35 | 0.33 | 14.13 | 3.09 | 5.20 | 0.021 | 0.05 |
| (g) | 0.48 | 0.30 | 0.24 | 13.96 | 6.15 | 5.12 | 0.017 | 0.04 |
| (h) | 0.42 | 1.32 | 0.27 | 14.00 | 0.52 | 5.04 | 0.018 | 0.19 |
| (i) | 0.42 | 0.36 | 0.33 | 26.25 | — | 4.94 | 0.025 | 2.75 |
| (j) | 0.46 | 0.27 | 0.30 | 14.35 | — | 3.15 | 0.019 | 3.82 |
| (k) | 0.44 | 0.30 | 0.24 | 13.97 | 0.50 | 2.66 | 0.020 | 0.37 |
| (l) | 0.43 | 0.37 | 0.29 | 14.24 | 3.03 | — | 0.014 | 0.045 |
| (m) | 0.43 | 0.29 | 0.34 | 14.03 | — | — | 0.016 | 0.44 |
| (n) | 0.42 | 0.34 | 0.30 | 9.41 | 1.62 | 5.22 | 0.017 | 0.28 |

As is seen from Table 2, the inclusion of Cr-Al combination, particularly of Al, markedly improves the oxidation resistance. The oxidation resistance, however, decreases considerably when the Cr content decreases below 10%, as in the specimen (n), even if Al is present. The improvement in oxidation resistance by the inclusion of Cr only (no Al), as in the specimen (i), has a limit and it is difficult to increase the oxidation resistanc to a level which renders the chromium plating unnecessary. When 2 Al are present for 14 Cr, a sufficient oxidation resistance is imparted to the mold which is intended to be used without chromium plating.

Si exhibits also a remarkable effect on the improvement in oxidation resistance. Such an effect of Si can be To sum up, in order to dispense with the chromium plating, it is necessary to incorporate in the steel composition a combination of Cr-Al or Cr-Al-Si, Al being the basic component, in order to impart to the steel material an oxidation resistance equal to or higher than that of the chromium plating. The present invention covers the range of composition to realize such combinations.

The lower limit of Al is 1.00% and the proper proportion of Al depends on the amount of Si and Cr to be incorporated in the composition.

If Al is absent in the steel composition, as in the specimen (a), the addition of Co to a high-Cr steel decreases the oxidation resistance. Therefore, the incorporation of Co is possible only on the condition that the steel composition contains Al in the range as herein specified.

Table 3 shows the corrosion resistance of the present steel to Glauber's salt ($Na_2SO_4$). It is seen that the steel of this invention has a corrosion resistance to Glauber's salt superior to that of metallic Cr.

Table 3

| | | Weight loss due to corrosion (mg/cm²) 900° C. × 20 hr. |
|---|---|---|
| A | (Steel of this invention) | 0.08 |
| E | (Comparative steel) | 0.04 |
| F | (Prior art steel) | Complete dissolution |
| Metallic Cr | | 1.50 |

Although excellent in oxidation resistance and corrosion resistance to Glauber's salt, the comparative steel E (low C-Cr-Al ferrite steel) is unsuitable for use as the mold material for molding glass, because its mechanical strengths at ordinary and high temperatures are unsatisfactory and, hence, susceptible to formation of irregular pattern due to the thermal stress, seizing, and growth of the crystal grains during the molding operation.

B. Structure and mechanical strengths.

If the comparative steel E (low C-Cr-Al ferrite steel) in Table 1 is used in making the mold for molding glass, the thermal stress set up in the surface layer of the mold during molding operation soon results in thermoplastic strain in the surface layer owing to the insufficient mechanical strengths of the mold, leading to premature heat checks on repetition of the molding cycle until before long the mold becomes unsuitable for normal running.

The accompanying FIG. 1 shows a photograph of an example of the mold made of a low C-Cr-Al ferrite steel and used in glass molding. There are seen on the mold surface the formation of premature thermoplastic strain patterns. Since these patterns are transferred to the molded glass, such a mold is unsuitable for use in glass molding.

Figure 2:
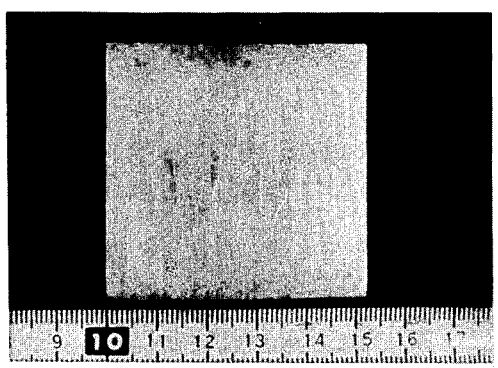

A martensite structure with intermingled ferrite is also unsuitable for glass molding, because as shown in the photograph of FIG. 2, owing to the difference in oxidation resistance between the ferrite region and the martensite region, a uniform anti-oxidative mold surface is not obtained and, in addition, thermoplastic strain is accumulated in the ferrite region.

For instance, in Table 4 are shown a few examples of steels having chemical compositions in the range as herein specified, which, however, showed non-uniform oxidizability and, hence, non-uniform oxide film and failed to manifest sufficient mechanical strengths. This is because, as shown in the table, each of these steels has a high Cr-equivalent exceeding 13.00 which favors the formation of a martensite structure intermingled with ferrite structure.

Table 4

|   |   | C | Si | Mn | Cr | Al | Co | N | Cr-equivalent (%) |
|---|---|---|---|---|---|---|---|---|---|
| A | (Steel of this invention) | 0.41 | 0.39 | 0.42 | 14.07 | 2.03 | 6.00 | 0.016 | +10.98 |
| (1) | (Comparative steel) | 0.25 | 0.27 | 0.40 | 14.38 | 2.15 | 4.35 | 0.017 | +19.79 |
| (2) | (Comparative steel) | 0.40 | 1.55 | 0.52 | 14.40 | 2.70 | 6.38 | 0.014 | +25.88 |
| (3) | (Comparative steel) | 0.38 | 0.42 | 0.46 | 19.75 | 1.98 | 5.62 | 0.019 | +18.30 |

In Table 5 are shown mechanical strengths of steels of this invention and a comparative steel at ordinary and at a high temperature.

Table 5

|   |   | 20° C. | | 700° C. | |
|---|---|---|---|---|---|
|   |   | 0.2% yield strength (kg/mm$^2$) | Tensile strength (kg/mm$^2$) | 0.2% yield strength (kg/mm$^2$) | Tensile strength (kg/mm$^2$) |
| A | (Steel of this invention) | 78.5 | 94.8 | 17.0 | 21.7 |
| B | (Steel of this invention) | 85.7 | 100.6 | 19.2 | 25.3 |
| C | (Steel of this invention) | 81.7 | 98.5 | 17.6 | 23.5 |
| D | (Steel of this invention) | 78.0 | 93.9 | 17.3 | 22.0 |
| E | (Comparative steel) | 38.2 | 52.8 | 7.1 | 9.0 |
| F | (Prior art steel) | 59.4 | 79.0 | 10.3 | 16.5 |

It is seen from the table that the steel of this invention is superior in mechanical strengths at ordinary and at a high temperature to the prior art steel (13-Cr martensite steel) and the comparative steel (low C-14 Cr-Al ferrite steel).

As a rule, the steel of this invention is purchased from a steel mill after having been hardened and tempered and the purchased steel is machined and engraved to make a mold which is used without further treatment. Accordingly, the standard hardness of the heat-treated steel is set at $H_B$ 229–293, because an unnecessarily high hardness results in reduced machinability and reduced malleability, the latter of which leads to heat shock cracking of the mold during molding operation.

C. Seizing resistance.

In Table 6 is shown the seizing and wear resistance of the present steel and other steels, as measured against glass.

Table 6

|   | C | Si | Mn | Cr | Al | Co | N | Ratio of seizing and wearing amount* | Structure | Cr-equivalent (90) |
|---|---|---|---|---|---|---|---|---|---|---|
| (a) | 0.05 | 0.22 | 0.45 | 14.25 | 2.06 | 6.22 | 0.020 | 271 | Ferrite | +24.4 |
| (b) | 0.22 | 0.25 | 0.41 | 14.03 | 2.04 | 6.17 | 0.018 | 193 | Ferrite+Martensite | +17.5 |
| (c) | 0.24 | 0.23 | 0.48 | 21.61 | 1.36 | 9.51 | 0.025 | 162 | Marsensite | +9.0 |
| (d) | 0.45 | 0.25 | 0.42 | 14.16 | 2.00 | 6.15 | 0.015 | 100 | Martensite | +8.1 |
| (e) | 0.65 | 0.27 | 0.54 | 14.07 | 2.03 | 6.21 | 0.017 | 70 | Martensite | 0 |
| (f) | 0.08 | 0.24 | 0.51 | 16.39 | — | Ni 35.47 | 0.020 | 221 | Austenite | — |
| (g) | 0.24 | 0.68 | 0.72 | 12.85 | — | — | 0.014 | 198 | Martensite | — |

*Test method
Samples were subjected to repeated rotary frictions in contact with mass of glass at 600° C. and the wear amount was expressed in ratio taking wear amount of the sample (d) as 100.

As compared with the martensite steel, other steels such as low carbon ferrite steel, ferrite-martensite steel and austenite steel show a larger seizing and wear amount and in this sense these other steels are not suitable for the mold for glass casting. The steel of this invention shows a lower seizing and wear amount, because it has a martensite structure with Cr-base carbides uniformly dispersed therein, has an adequate hardness after heat treatment and, in addition, is covered on the surface with Cr-Al-based dense oxide film.

Thus, in view of the seizing and wear resistance, the steel of this invention is required to have a martensite structure and a proper amount of C which is uniformly dispersed therein in the form of carbide. The carbon content should be 0.25% or more, depending on the amount of other alloying elements.

D. Physical properties.

The thermal expansion coefficient of the present steel (mean value at 0°–600° C.) is shown in Table 7-1. It is seen from the table that the coefficient of the present steel is desirable, being comparable to that of the prior art steel.

Table 7-1

|   |   | Thermal expansion coefficient ($10^{-6}/°$ C.) |
|---|---|---|
| A | (Steel of this invention) | 12.4 |
| B | (Steel of this invention) | 12.2 |
| C | (Steel of this invention) | 12.5 |
| D | (Steel of this invention) | 12.2 |
| E | (Comparative steel) | 12.4 |
| F | (Prior art steel) | 12.0 |
| G* | (Comparative austenite steel) | 18.5 |

| *C | Si | Mn | Ni | Cr | N |
|---|---|---|---|---|---|
| 0.08 | 0.24 | 0.51 | 35.47 | 16.39 | 0.020 |

As shown in the table, austenite steel (comparative steel G) has inherently a large thermal expansion coefficient which increases thermal stress in molding operation and, hence, is unsuitable for the present purpose.

The thermal conductivity is shown in Table 7-2. Austenite steel has, as one of its characteristics, a small thermal conductivity which gives rise to increased thermal stress, as does the large thermal expansion coefficient. In this respect too, austenite steel is unsuitable. It is also seen from the table that the increase in Si and Al content brings about the decrease in thermal conductivity. Therefore, the addition of an excessive amount of these elements is undesirable.

Table 7-2

|   |   | Thermal conductivity (cal/cm . sec . ° C.) | |
|---|---|---|---|
|   |   | 400° C. | 600° C. |
| A | (Steel of this invention) | 0.052 | 0.061 |
| B | (Steel of this invention) | 0.045 | 0.057 |
| C | (Steel of this invention) | 0.050 | 0.062 |
| F | (Prior art steel) | 0.071 | 0.072 |
| G | (Comparative austenite steel) | 0.039 | 0.048 |

E. Heat check resistance.

In Table 8 is shown the heat check resistance of the steel of this invention. In order to maintain a good heat check resistance, the steel should have high mechanical strengths at high temperatures to minimize the development of thermal strain due to the thermal stress, a good malleability to retard the growth of checks which have been formed, and, in addition, a large thermal conductivity as well as a small thermal expansion coefficient to minimize the thermal stress.

Table 8

|   |   | Number of checks | Average length of check (mm) | Maximum length of check (mm) | Remarks |
|---|---|---|---|---|---|
| A | (Steel of this invention) | 79 | 0.090 | 0.19 | |
| B | (Steel of this invention) | 76 | 0.095 | 0.25 | |
| C | (Steel of this invention) | 82 | 0.092 | 0.20 | |
| D | (Steel of this invention) | 81 | 0.091 | 0.19 | |
| E | (Comparative steel) | 51 | 0.079 | 0.20 | Surface irregularities |
| F | (Prior art steel) | 90 | 0.081 | 0.24 | |
| G | (Comparative austenite steel) | 37 | 0.174 | 0.41 | Surface irregularities |

In the case of the present steel, the uniform martensite structure gives sufficient mechanical strengths and the hardness after heat treatment of $H_B$ 229–293 is desirable for practical purposes. An excessively high hardness accelerates the growth of checks as is also the case with an excessively high carbon content. It is seen from Table 8 that the steel of this invention has a heat check resistance comparable to that of the prior art steel and that the heat check resistance decreases with the increase in carbon content of the steel. Because of its low heat check resistance, the austenite steel (comparative steel G in Table 8) is unsuitable for the mold of this invention.

The grounds for the limitation of ranges of the compositions of the steels of this invention are described below.

Cr is an element necessary for imparting oxidation resistance. It raises $A_1$ transformation point, combines with C to form carbides, thereby increasing the wear resistance, and hinders the increase in the crystal grain size. Since Cr is a ferrite producing element, an excessive amount of it brings about an excessive increase in the amount of austenite producing elements (such as C, Co, Mn and N) to be balanced with Cr, resulting in decreased toughness and decreased heat conductivity. Accordingly, the Cr content should not exceed 20.00% and not less than 10.00% to ensure the above-noted desirable effect. A preferable range of the Cr content is from 12.00 to 18.00%.

Al is the most important element for imparting to the steel composition a high oxidation resistance characteristic of the steel of this invention. Generally, a metal mold for glass casting is imparted with satisfactory oxidation resistance when its Al content is about 2% for a Cr content of 15%. For a mold required to be of an especially high oxidation resistance, a higher Al content is allowable. However, since the increase in Al content results in a decrease in thermal conductivity and an excessive amount of austenite producing elements is required to balance with the amount of Al which is a powerful ferrite producing element, the maximum limit of the Al content is 3.00%. On the other hand, when a high thermal conductivity is particularly required, Al content is rather decreased while increasing the amount of Cr which less tends to decrease the thermal conductivity than Al. However, in view of oxidation resistance, the lower limit of Al content is 1.00%. A preferable Al content is in the range from 1.50 to 2.50%.

Inclusion of C is necessary as an austenite producing element. On heat treatment, the austenite transforms into martensite having high mechanical strengths at ordinary and high temperatures. Other desirable effects of C include formation of carbides which impart to the steel a seizing and wear resistance and hinders the increase of crystal grain size. However, since an excessive amount of C reduces the malleability and heat check resistance, the upper limit of inclusion shall be 0.65%. On the other hand, since too low a C content leads to formation of ferrite structure, depending upon the amounts of Cr, Al and Si, and the above-noted desirable effect of C is lost, the lower limit shall be 0.25%.

Co is an indispensable element which is incorporated as an austenite producing element together with C, Mn and N in order to produce the martensite structure which increases the mechanical strengths at ordinary temperature as well as at high temperatures, the increase in high temperature strength being due to enhancement of the formation of solid solution. As compared with other austenite producing elements such as Mn and Ni, Co gives a lower hardness after annealing which lessens the decline in machinability. The inclusion of Co raises $A_1$ transformation point and is advantageous in the case where the mold is liable to be exposed to a high temperature. Aside from C, Co is an effective austenite producing element having little harmful effect. Furthermore, Co contributes to the improvement in compactness and adhesiveness of the oxide film on the mold surface and also in resistance of the mold surface against seizure. Although Co imparts to the mold the above characteristics, the inclusion of an excessively large amount exceeding 13.00% deteriorates the oxidation resistance and toughness of the mold. On the other hand, if the included amount is as small as less than 4.00%, ferrite structure is liable to be formed, depending upon the ratio of other austenite producing elements such as C, Mn and N to the ferrite producing elements such as Cr, Al and Si, and the above desirable effects are lost. A preferable Co content is in the range from 4.00 to 8.00%

In accordance with the purpose and the use, Mn is incorporated as an austenite producing element to hinder the formation of ferrite. An excessive amount of Mn is undersirable for the reduction of hardness by annealing or by hardening and subsequent tempering and, hence, for the machinability. Further, Mn lowers $A_1$ transformation point and oxidation resistance. Therefore, Mn content of the present steel is 2.00% or less. A preferable Mn content is 1.00% or less.

Si is included together with Cr and Al to improve the oxidation resistance. However, if the Si content is too high, the thermal conductivity of the mold is decreased and, since Co is a powerful ferrite producing element, the amount of austenite producing elements necessary to balance with the Si becomes too large, resulting in reduced toughness. Therefore, the Si content is 2.50% at the maximum and generally 2.00% or less.

N is added as an austenite producing element and effectively hinders the formation of ferrite. The N content of the present steel produced by the customary method is 0.25% at the maximum.

As described hereinabove, the characteristic features of the steel of this invention include an oxidation resistance and a corrosion resistance to Glauber's salt superior to those of a Cr-plated steel; a proper balance between the amount of ferrite producing elements and the amount of austenite producing elements; desirable mechanical strengths at ordinary and high temperatures after heat treatment and a desirable malleability; martensite structure excellent in physical properties; an excellent heat check resistance and an excellent seizing and wear resistance. Thus, the present invention provides a metal mold which need not be Cr-plated and is suitable for use in casting high-quality glass wares.

What is claimed is:

1. A steel for metal mold for molding glass which consists of 0.25–0.65% of C, up to 2.50% of Si, up to 2.00% of Mn, 10.00–20.00% of Cr, 4.00–13.00% of Co, 1.00–3.00% of Al, up to 0.25% of N and the balance essentially Fe and ordinary impurities and satisfies the relation:

$$\text{Cr equivalent} = -40C(\%) + 6Si(\%) - 2Mn(\%) + Cr(\%) - 2Co(\%) - 30N(\%) + 12Al(\%) \leq 13\%$$

and which has a single phase of martensite by a heat treatment for hardening and tempering and has a standard hardness of $H_B$ 229–293 after said heat treatment.

2. A steel for metal mold for molding glass which consists of 0.30–0.50% of C, up to 2.00% of Si, up to 1.00% of Mn, 12.00–18.00% of Cr, 4.00–8.00% of Co, 1.50–2.50% of Al, up to 0.25% of N and the balance essentially Fe and ordinary impurities and satisfies the relation:

$$\text{Cr equivalent} = -40C(\%) + 6Si(\%) - 2Mn(\%) + Cr(\%) - 2Co(\%) - 30N(\%) + 12Al(\%) \leq 13\%$$

and which has a single phase of martensite by a heat treatment for hardening and tempering and has a standard hardness of $H_B$ 229–293 after said heat treatment.

3. A metal mold for molding glass that provides a glass casting surface without being chromium-plated and that is formed of a steel which consists essentially of 0.25–0.65% of C, up to 2.50% of Si, up to 2.00% of Mn, 10.00–20.00% of Cr, 4.00–13.00% of Co, 1.00–3.00% of Al, up to 0.25% of N and the balance essentially Fe and ordinary impurities and satisfies the relation:

$$\text{Cr equivalent} = -40C(\%) + 6Si(\%) - 2Mn(\%) + Cr(\%) - 2Co(\%) - 30N(\%) + 12Al(\%) \leq 13\%$$

and which has a single phase of martensite by a heat treatment for hardening and tempering and has a standard hardness of $H_B$ 229–293 after said heat treatment.

4. A metal mold for molding glass that provides a glass casting surface without being chromium-plated and that is formed of a steel which consists essentially of 0.30–0.50% of C, up to 2.00% of Si, up to 1.00% of Mn, 12.00–18.00% of Cr, 4.00–8.00% of Co, 1.50–2.50% of Al, up to 0.25% of N and the balance essentially Fe and ordinary impurities and satisfies the relation:

$$\text{Cr equivalent} = -40C(\%) + 6Si(\%) - 2Mn(\%) + Cr(\%) - 2Co(\%) - 30N(\%) + 12Al(\%) \leq 13\%$$

and which has a single phase of martensite by a heat treatment for hardening and tempering and has a standard hardness of $H_B$ 229–293 after said heat treatment.

* * * * *